Dec. 6, 1949 H. C. CRANE 2,490,256
CONVEYER CONTROL
Filed March 14, 1946 6 Sheets-Sheet 1
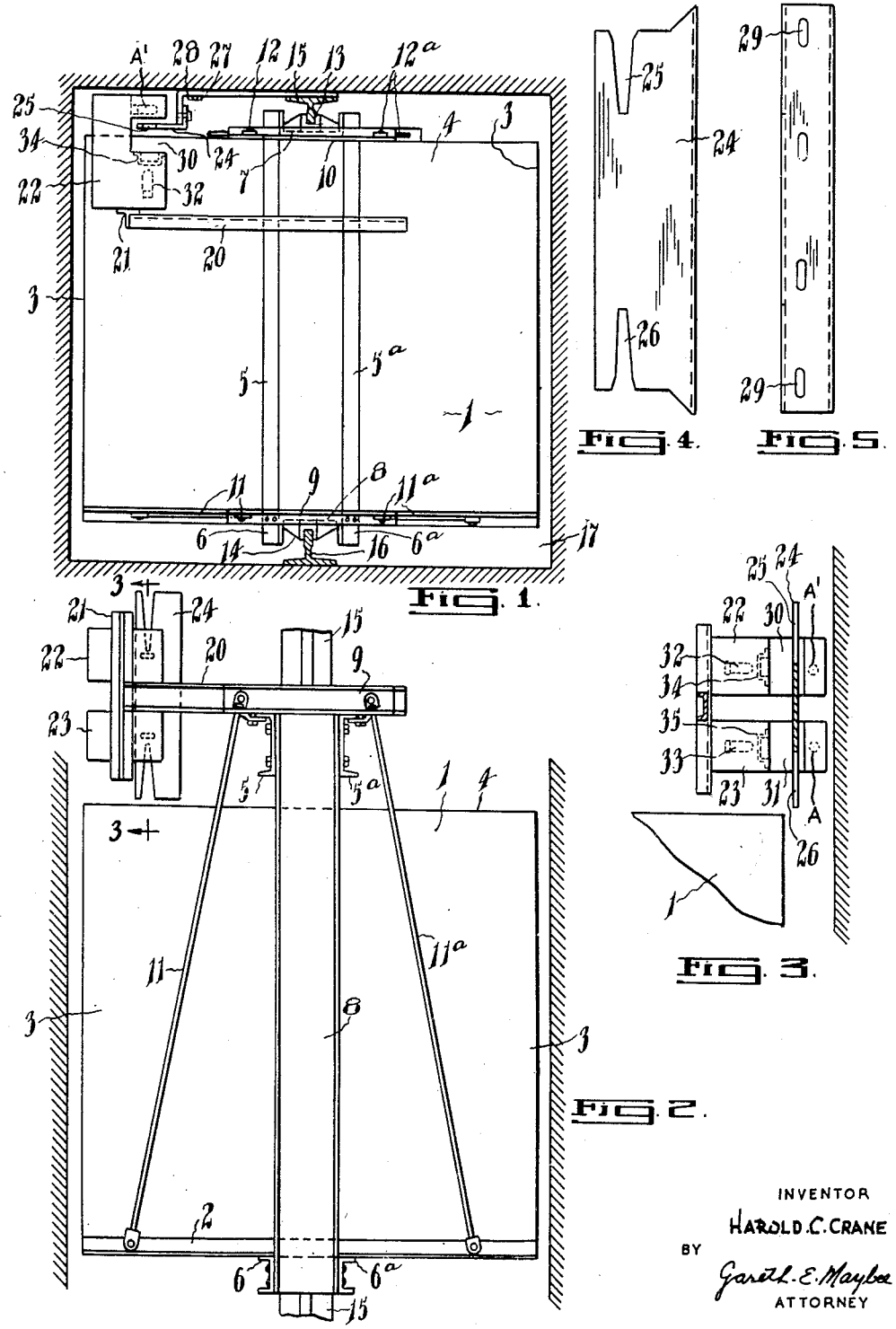
INVENTOR
HAROLD C. CRANE
BY
Gareth E. Maybee
ATTORNEY

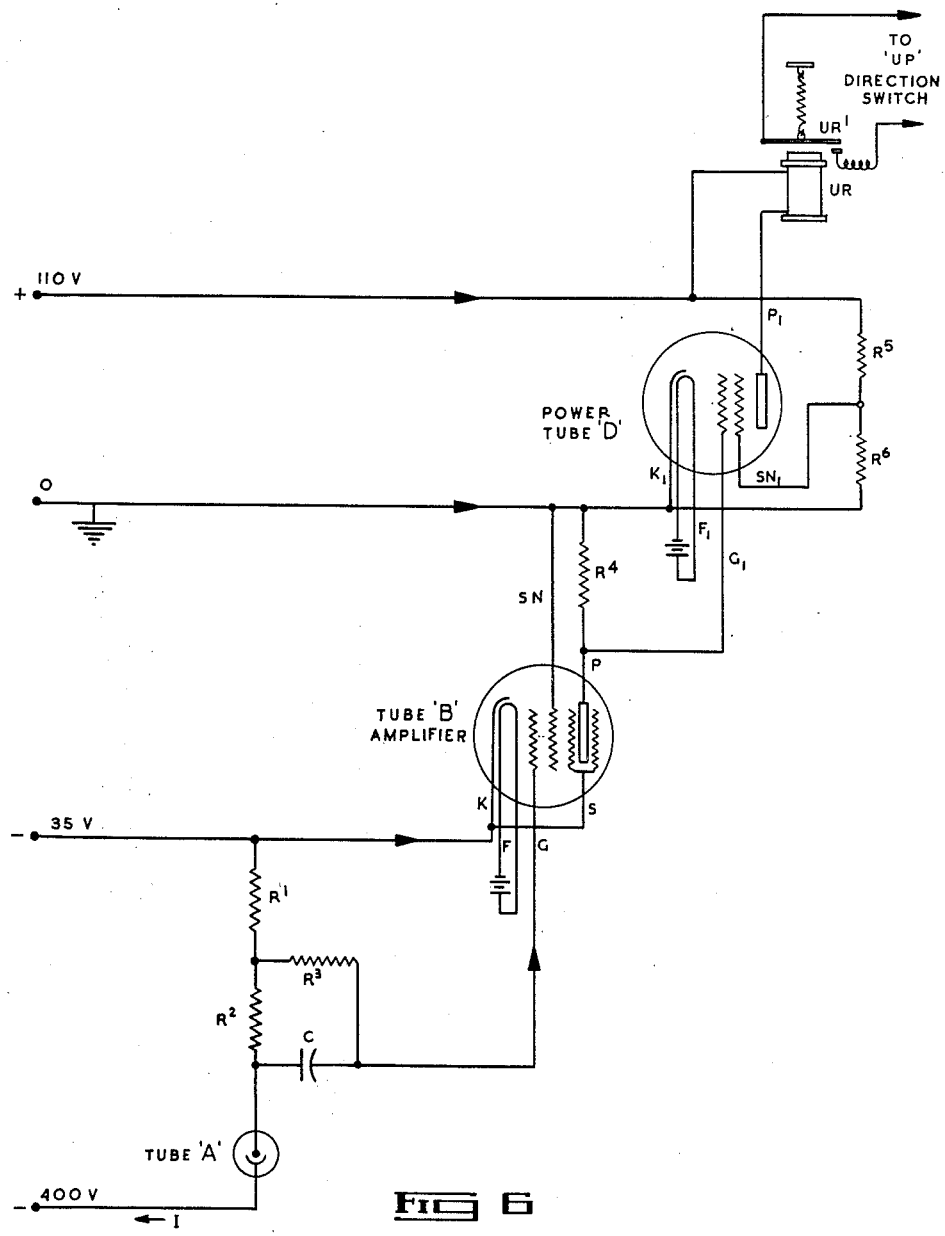

INVENTOR
HAROLD. C. CRANE
BY
Gareth E. Maybee
ATTORNEY

Dec. 6, 1949   H. C. CRANE   2,490,256
CONVEYER CONTROL
Filed March 14, 1946   6 Sheets-Sheet 4

INVENTOR
HAROLD C. CRANE
BY
Gareth E. Maybee
ATTORNEY

Dec. 6, 1949 H. C. CRANE 2,490,256
CONVEYER CONTROL
Filed March 14, 1946 6 Sheets-Sheet 5

INVENTOR
HAROLD. C. CRANE
BY
Gareth. E. Maybee
ATTORNEY.

Dec. 6, 1949   H. C. CRANE   2,490,256
CONVEYER CONTROL
Filed March 14, 1946   6 Sheets-Sheet 6

INVENTOR
HAROLD·C·CRANE
BY
Gareth E. Maybee
ATTORNEY

Patented Dec. 6, 1949

2,490,256

UNITED STATES PATENT OFFICE 2,490,256

CONVEYER CONTROL

Harold C. Crane, Toronto, Ontario, Canada

Application March 14, 1946, Serial No. 654,235

18 Claims. (Cl. 187—29)

This invention relates to methods of, and apparatus for controlling elevators, intermittent conveyors and the like, and particularly high speed elevator systems.

There are many factors in elevator operation which affect to varying degrees the accuracy of stopping of the car at the landing. Among these are the velocity at which the car is travelling, the acceleration or deceleration of the car at any given time, and the load being carried by the car.

This invention is directed to compensating for the effect of factors variably affecting the accuracy of stopping of an elevator car, and has for its principal object controlling the point at which changes in power to the motor and other operating mechanism are initiated, by means which anticipate the distance from a landing at which such a change in power to the motor and other controlling mechanism should start in order to make a stop of the desired accuracy at the landing.

It is the main object of this invention to provide means which automatically initiate, vary or interrupt the supply of power to the elevator car driving and braking mechanism at a time such that the final stopping of the elevator car takes place at the desired point regardless of its previous speed, or the rate of change of its speed, or the load upon the source of power. With this object in view, means are provided whereby the supply of power is varied or stopped when the elevator car, in its approach toward a landing at which it is to stop, has reached a certain point the distance of which from said landing at which it is to stop is a function of either the velocity, the rate of change of velocity, or a combination of them.

Considered more specifically the preferred form of this invention provides in connection with driving and controlling mechanism for an elevator, means whereby the supply of current to the motor is shut off or varied when the elevator car is at such a distance from the landing at which it is to stop, that by its momentum it will normally be carried just to the predetermined or desired stopping point, whatever be the speed of the elevator and the load thereon. If perchance it is carried beyond the predetermined point, then the motor will be automatically reversed, the elevator will travel in the opposite sense, and will most probably on this second trial, stop level with the floor.

In relevelling an ordinary automatic elevator which has not initially stopped level with the floor, the speed reached in this operation depends upon the distance travelled. If it is decided to set the "up" and "down" levelling switches to operate at say a quarter inch below and above the floor respectively, it will be found possible to stop the car within a limit of one-half inch (plus or minus one-quarter inch) on the first trial, only if the car speed does not exceed say ten feet per minute. To limit the speed to ten feet per minute a common solution has been to provide a second motor, gear reduction, brakes, and a magnetically operated clutch, by means of which the elevator may be operated at a fraction of its "contact" speed during the relevelling operation. One objection to such a system is the extra equipment involved, and another objection is that too great a time interval is taken for the relevelling because of the low speed at which the elevator has to be operated if the distance to be travelled in the levelling operation is greater than one or two inches.

The invention described and claimed herein relates to a device which automatically initiates a stopping operation at a variable distance from the floor, which distance is determined by the instantaneous velocity at the moment the stopping operation is initiated. By the use of this invention the relevelling device may be set for a dead zone of say one-quarter inch above and below the floor, and yet if the velocity of the car is such that the car will slide two inches beyond the level of the floor after the stopping operation is initiated, then the stopping operation in this case will automatically be initiated at a point two inches earlier than it normally would have been, thus preventing "overshooting the floor." With this invention it is not necessary at the time of manufacture to know the exact relation between the car velocity and the car slide due to the partciular construction of the specific elevator, because the relative effectiveness of the car velocity in advancing the stopping point can be increased or decreased over a wide range by merely turning an adjustment knob. In practice the change effected by this adjustment knob is to vary electrical resistances as will hereinafter be described.

The embodiment of the invention above referred to will be described in connection with the accompanying drawings, in which:

Figure 1 is a top plan view of an elevator shaft with a car therein showing how the apparatus which is disclosed and claimed herein is mounted to the car and to the shaft.

Figure 2 is an elevation of same.

3

Figure 3 is a vertical sectional view taken along the line 3—3 of Figure 2.

Figure 4 is an elevation of a stationary vane used with said invention, showing the general shape of the slots therein.

Figure 5 is a side elevation of the said stationary vane.

Figure 6 is a wiring diagram illustrating the basic operation of this invention.

Figure 7:
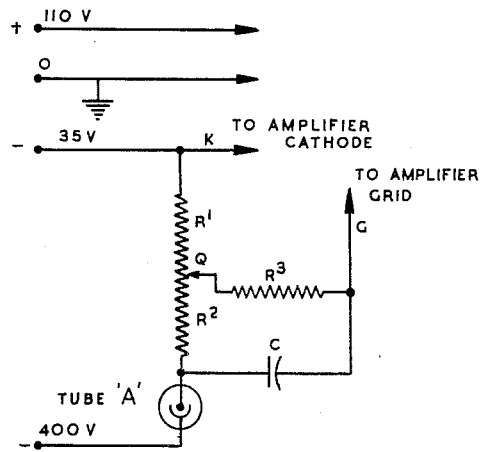

Figure 7 is a slightly modified form of the wiring diagram shown in Figure 6.

Figure 8:
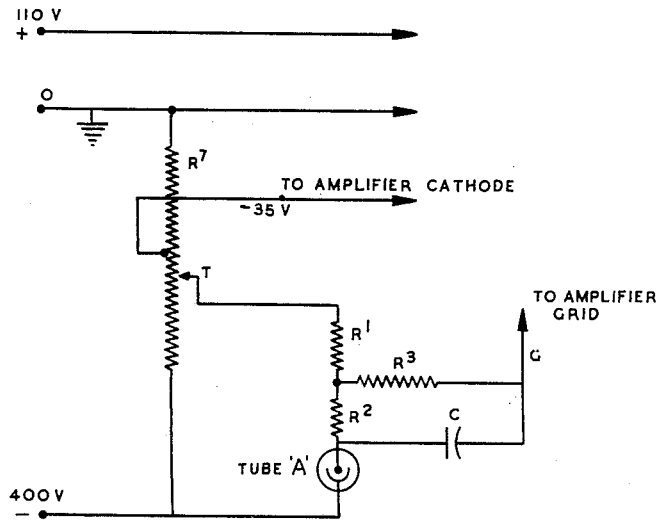

Figure 8 is a wiring diagram of a form of this invention which is further modified.

Figure 9:
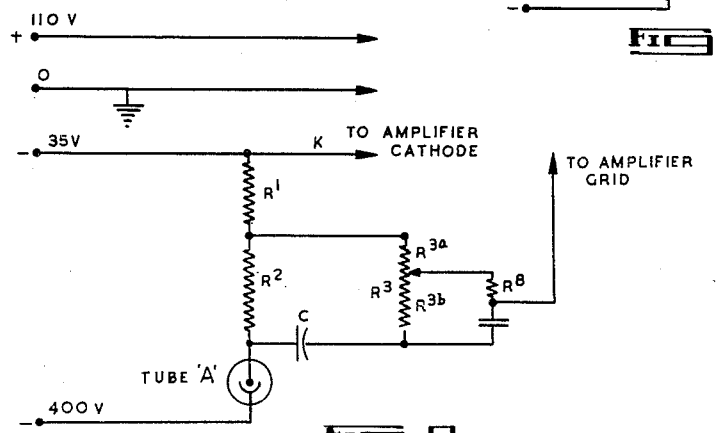

Figure 9 is a wiring diagram of another modified form of this invention.

Figure 10:
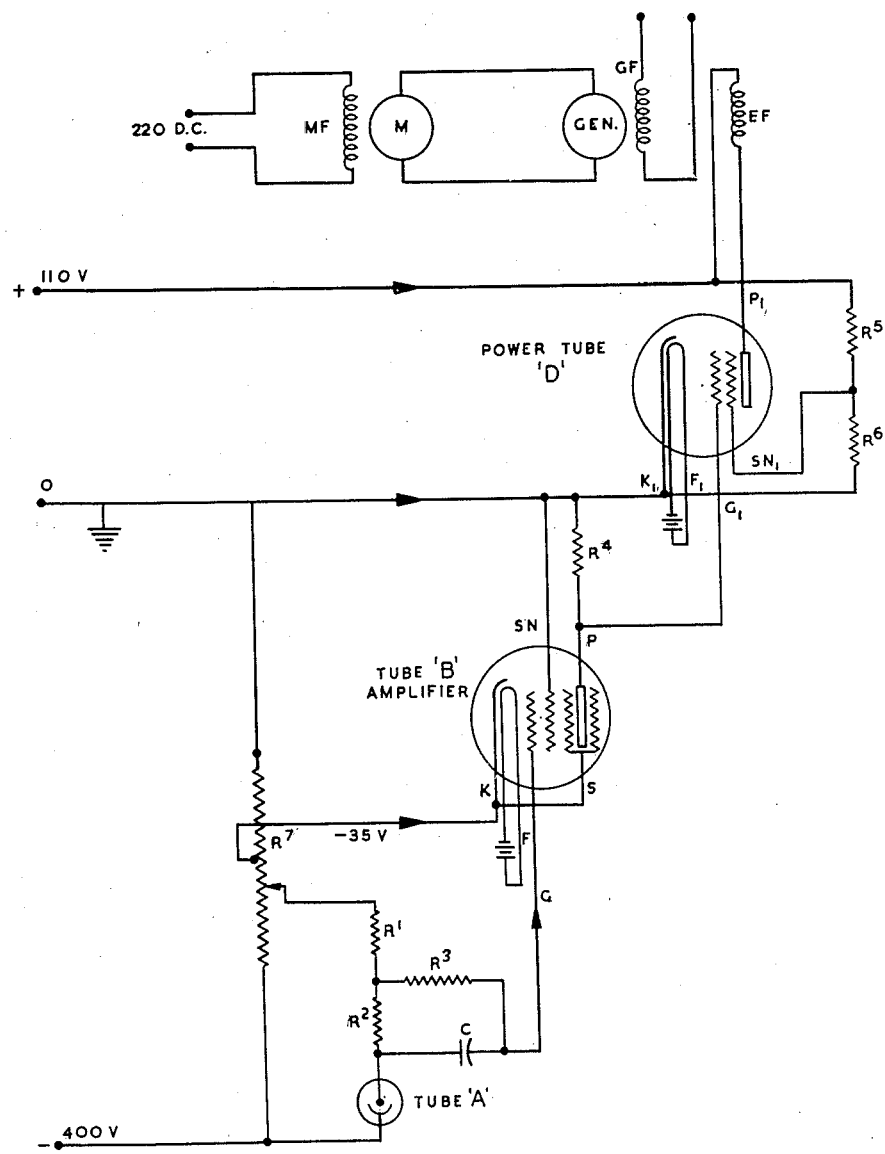

Figure 10 is a wiring diagram of a further modification of this invention as applied to a variable voltage elevator.

Figure 11:
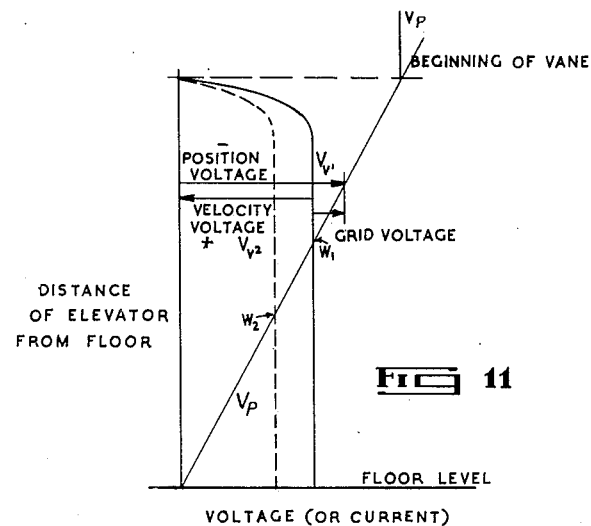

Figure 11 is a graph illustrating the relation between position voltage and velocity voltage with respect to the distance of the elevator from the floor, as will be hereinafter described.

Figure 12:
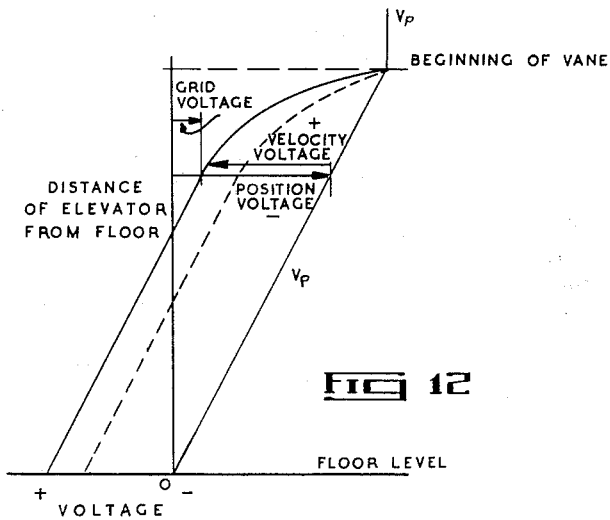

Figure 12 is a graph illustrating the relation between grid voltage and the distance of the elevator from the floor, said graph being based on that shown in Figure 10.

Figure 13:
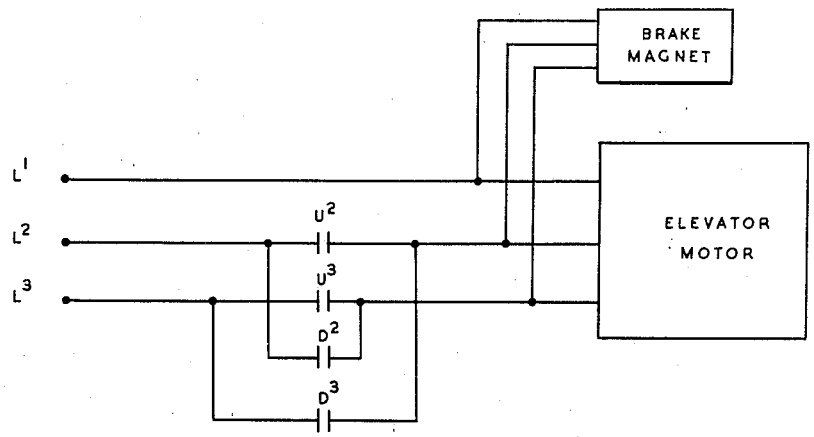

Figure 13 is a diagram showing the power wiring of the elevator.

Figure 14:
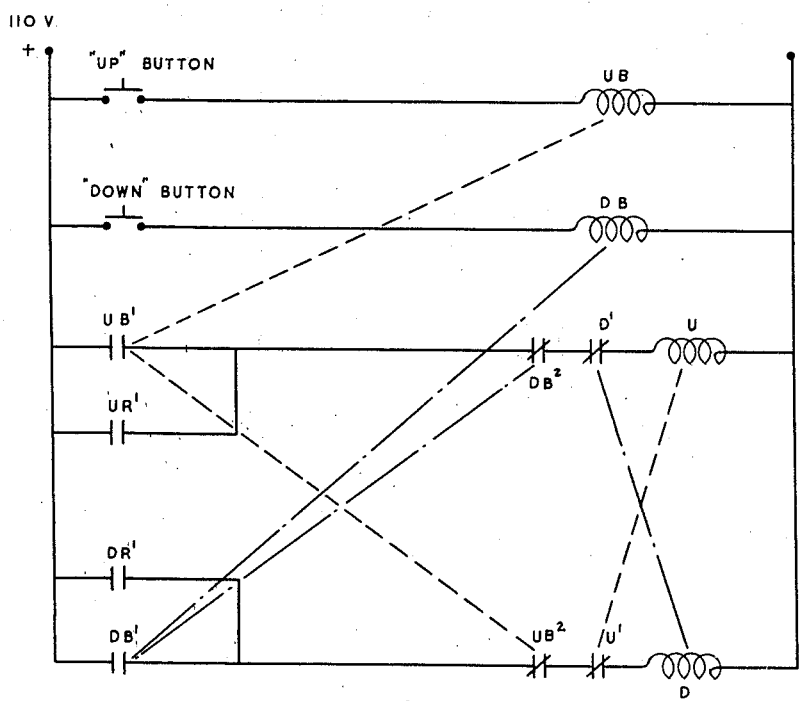

Figure 14 is a schematic diagram of the elevator control system.

Figures 7, 8, and 9 show only those portions of modified circuits which are different from the basic circuit shown in Figure 6. It is obvious that the four leads terminated by arrows in each of Figures 7, 8, and 9 are connected to the remainder of the basic circuit shown in Figure 6. In the drawings, like numerals and letters of reference indicate coresponding parts in the different figures. In the wiring diagrams and in the schematic diagram, standard symbols and representatives are used throughout.

Referring now particularly to Figures 1, 2, and 5, the structural embodiments of this invention will firstly be described.

An elevator car 1, comprising flooring 2, walls 3, and roof 4 is mounted in a cradle. The cradle comprises upper channels 5 and 5a which are above the roof 4, lower channels 6 and 6a, on which rests flooring 2 and they are bolted at their extremities to side channels 7 and 8, thus forming a rectangular structure. Angles 9 and 10 are bolted transversely to channels 5 and 5a at each extremity thereof.

The upper extremities of stay rods 11 and 11a are respectively attached to the extremities of angle 9, the lower extremities of said stay rods being suitably bolted to flooring 2. Stay rods 12 and 12a are similarly attached to angle 10 and bolted to flooring 2.

Mounted near the upper extremity of side channels 7 and 8 are guide shoes 13 and 14 which travel respectively along guide rails 15 and 16 which are fixedly mounted on opposite sides of shaft 17 thus guiding the car; similar guide shoes are mounted near the lower extremity of the side channels.

The car may be suspended in shaft 17 by any of the usual means, say by means of a steel cable, one end of said cable being attached to channels 5 and 5a. The other end of the cable may be coiled around a drum at the top of the shaft, said drum being geared to a motor in the usual manner.

Rigidly fixed to channels 5 and 5a above the car 1 and parallel to the roof 4 is another channel

4

20 at one extremity of which is rigidly connected a suitable angle 21, which is vertically mounted. Adjustably mounted to angle 21 are two photoelectric control units 22 and 23.

Mounted to the walls of the shaft at each floor are stationary vanes 24 having therein notches 25 and 26, said notches being substantially V-shaped. In practice each vane 24 is mounted to a suitable angle 27 bolted to the side wall of the shaft, by means of bolt and nut assembly 28 which passes through elongated hole 29 so as to provide the desired vertical adjustment of the vane with respect to the side walls.

The containers for photo-electric control units 22 and 23 are respectively provided with wide slots 30 and 31, and as the elevator car travels, vanes 24 pass through these wide slots. The photo-electric control units 22 and 23 are respectively provided with electric lamps 32 and 33 and optical lens systems 34 and 35 whereby the beams of light from the respective lamps are directed across the wide slots 30 and 31 to strike their respective photo-electric cells $A^1$ and A. Each optical lens system comprises one planospherical lens and one plano-cylindrical lens, so constructed as to produce beams of light approximately one-eighth of an inch high by one and a half inches wide at the plane of the vanes.

As will be apparent from this description, the photo-electric cell $A^1$ of the photo-electric control unit 22 does not exercise any control over the motor when the car is moving upwardly, and similarly the photo-electric cell A of the photo-electric control unit 23 does not exercise any control over the motor when the car is moving downwardly.

Assuming that the car is moving upward and is approaching the floor at which it is desired to stop, a vane 24 will pass through the wide slots 30 and 31 of photo-electric control units 22 and 23, and the intensity of the beam of light in photo-electric control unit 23 will be gradually reduced by V-notch 26, and when the elevator is at such a level that the beam of light is at the apex of V-notch 26, said beam of light will be cut off completely; the gradual reduction of the quantity of light striking photo-electric cell A caused by the vane will actuate the photo-electric circuit in a manner as hereinafter described, which in turn will actuate relay UR, (see Figure 6) through switches and contacts hereinafter described, controls the supply of power to the motor and brakes. Obviously if the elevator is moving downwards, then upper photo-electric control unit 22 and upper V-notch 25 will co-act in a similar manner.

In other words, the V-notches in the vanes control what fraction of the light will fall on the respective photo-electric cells A and $A^1$. When the car is more than say a quarater inch off level, light passes through a narrow part of the V-notch and reaches one of the photo-electric cells A or $A^1$. The farther the car is off level the more is the amount of light falling on the cell. Hence the amount of light falling on the cell is a measure of the car position, or in mathematical terms the amount of light falling on a cell is a function of the car position. For the sake of simplicity, let it be assumed the vane is in such a position that when the car is level with the floor, the light beams are at the apex of their respective V-notches. Under these conditions the position of the car with respect to the floor is directly proportional to the amount of light falling on the cell.

Figure 13 is a diagram showing the power wiring of the elevator. A three phase A. C. power supply is connected to the elevator motor and to the brake magnet, which are in parallel, the power being supplied by lines $L^1$, $L^2$, and $L^3$. The brake is so constructed that it engages when no power is applied to the magnet thereof, and it is released when the magnet thereof is energized. Contacts $U^2$ and $D^2$ are inserted in line $L^2$, and contacts $U^3$ and $D^3$ are inserted in line $L^3$. It is obvious that if contacts $U^2$ and $U^3$ are closed (contacts $D^2$ and $D^3$ being open), power will flow to the motor and to the brake magnet, and the brake will be released and the motor will rotate in one direction. On the other hand, if contacts $D^2$ and $D^3$ are closed (contacts $U^2$ and $U^3$ being open) this will be equivalent to "crossing" lines $L^2$ and $L^3$, and thereby the brake magnet will be released, but the elevator motor will rotate in the other direction. It is well known in the art that a 3 phase A. C. motor can be reversed by crossing or interchanging the connections of two of the power supply lines.

Figure 14 is a schematic diagram of the elevator control system. Direct current, usually at 110 volts, is supplied through lines 100 and 101 to the various relays and switches. The "up" direction relay comprises coil UB, which, when energized, closes normally-open contact $UB^1$ and opens normally-closed contact $UB^2$. The "down" direction relay comprises coil DB which, when energized closes normally-open contact $DB^1$ and opens normally-closed contact $DB^2$.

The "up" direction switch comprises coil U, which when energized opens normally-closed contact $U^1$ and closes normally-open contacts $U^2$ and $U^3$ in the motor circuit. The "down" direction switch comprises coil D which, when energized opens normally-closed contacts $D^1$ and closes normally-open contacts $D^2$ and $D^3$ in the motor circuit.

An "up" button and coil UB of the "up" direction relay are inserted in series between power lines 100 and 101, and a "down" button and "down" direction relay DB are similarly inserted in series between the said power lines. Normally-open contact $UB^1$, normally-closed contacts $DB^2$ and $D^1$, and coil U are connected in series between power lines 100 and 101, and similarly normally-open contact $DB^1$, normally-closed contacts $UB^2$ and $U^1$, and coil D are connected in series between power lines 100 and 101.

Contact $UR^1$ of photo-electric relay UR and contact $UB^1$ are in parallel; similarly contact $DR^1$ of photo-electric relay DR and contact $DB^1$ are also in parallel.

When the operator wishes the car to go upward, he presses the "up" button which energizes coil UB of the "up" direction relay, thereby closing contact $UB^1$ and opening contact $UB^2$. Current will therefore flow through contact $UB^1$, and through normally-closed contacts $DB^2$ and $D^1$, to coil U of the "up" direction switch. Coil U of the "up" direction switch being thus energized, normally-closed contact $U^1$ will open, and contacts $U^2$ and $U^3$ in the motor power supply circuit will close, thereby disengaging the magnetic brake and also supplying power to the motor in order to pull the elevator upward.

Contacts $DB^2$ and $D^1$ remain closed so long as coil DB of the "down" direction relay and coil D of the "down" direction switch are respectively not energized.

If as soon as the elevator starts moving upward, the operator removes his finger from the "up" button, coil UB of the "up" direction relay will be de-energized, thereby opening contact $UB^1$; but direction switch coil U will nevertheless remain energized since current will be passing through contact $UR^1$ of relay UR, said contact $UR^1$ being in parallel with contact $UB^1$.

Relay UR is the relay which has its operating coil in the plate circuit of the power tube of photo-electric leveling unit 23. When the car approaches the next floor, a point will be reached where relay UR is de-energized by the photo-electric leveling unit, as described elsewhere herein. This in turn will de-energize direction switch coil U, thereby opening contacts $U^2$ and $U^3$ (and closing contact $U^1$), which will disconnect the motor from the power supply and apply the brake; the car will then slide to a stop.

If the car stops short of the floor, the beam of light of photo-electric leveling unit 23 will still be passing through lower slot 26 of vane 24, which will again energize relay UR causing contact $UR^1$ to close, which will cause a further upward motion of the car.

If however, the car overshoots the floor, the beam of light of photo-electric leveling unit 22 will pass through upper slot 25 of vane 24, which will energize relay DR causing contact $DR^1$ thereof to close. This will close the circuit through normally-closed contacts $UB^2$ and $U^1$ to "down" direction switch coil D, which will start the car moving downward due to the closing thereby of contacts $D^2$ and $D^3$ in the motor power supply circuit. At the proper point, depending upon the speed of the car, photo-electric leveling unit 22 will cause relay DR to be de-energized, thereby opening contact $DR^1$ thereof and de-energizing coil D of the "down" direction switch which will open contacts $D^2$ and $D^3$, thereby preventing further supply of power to the motor, and applying the brakes.

Although only the operation of the "up" button, the "up" direction relay and contacts thereof, and the "up" direction switch and contacts thereof have been described in detail, it is obvious that the "down" button, the "down" direction relay and contacts thereof and the "up" direction switch and contacts thereof operate in a similar manner when the elevator travels downward and stops at the desired level.

Referring now to Figure 6 which is a wiring diagram illustrating the basic operation of this invention, and more specifically is a wiring diagram of say the photo-electric control unit 23, there is provided the photo tube A which allows the current I to flow through an electrical network comprising a resistor $R^1$, a resistor $R^2$ in parallel with a branch including resistor $R^3$ and condenser C, and then to the negative line which is marked $-400$ v. Other lines are marked $+110$ v., 0, and $-35$ v. Power to these lines may be supplied by any convenient means, say by batteries of dry cells. Obviously the 0 line is grounded.

If a vacuum type photo tube is used the current through it is proportional to the light flux falling on it and under the conditions assumed previously, it is proportional to the distance of the car from the floor provided the car is sufficiently close to the floor that the light beam is passing through a slot in a vane. Effectively the vacuum type photo-tube can be considered as a circuit element of variable impedance, whereas the vane is a means for varying the impedance of the said circuit element. The voltage drop across $R^1$ is, therefore, a measure of the instantaneous distance of the car from the floor; this is true whether the car be moving or stationary.

When the car is stationary, the current I will be constant and all of it will be passing through resistors $R^1$ and $R^2$ and there will be no current passing through resistor $R^3$ and condenser C, since it is a well known property of a condenser that it is responsive to changes in voltage only, and that it therefore prevents the flow of current when the voltage across it is constant. Then since there is no current passing through $R^3$, the voltage drop across it will be zero. But when the car is moving, the current I will be changing at a rate proportional to the velocity of the car; it may be shown mathematically that the voltage drop across resistor $R^3$ is proportional to the rate of change in current I, and hence proportional to the car speed. It may also be shown that in this circuit the voltage drop across resistor $R^3$ will be of the proper sign polarity to cause the grid voltage on amplifier tube B to be reduced by the velocity of the car toward the floor below the value it should have corresponding to the car position.

In Figure 7, resistors $R^1$ and $R^2$ are shown as being a single continuous resistor, and resistor $R^3$ may be connected to any point on it. By moving the point of tapping Q, the effectiveness of the car velocity in counteracting the position voltage may thus be increased or decreased at will.

As may be seen in Figure 6, the amplifier tube B is a pentode tube, preferably indirectly heated by heater filament F. The cathode K is connected to the —35 volt line, and the suppressor S is tapped to said cathode K. The grid G is tapped to the resistor $R^3$ at the point where it is connected to condenser C; the screen SN is grounded. The plate P is connected to ground through resistor $R^4$. For simplification, amplifier tube B is herein described as having "cut-off" at zero grid voltage. However, in practice it is selected to have "cut-off" at a small negative grid voltage and is operated at a low screen voltage (say 35 volts) to reduce the grid voltage required to produce cut-off.

Power tube D is preferably an indirectly heated beam power tube. It is heated by a filament $F_1$; its cathode $K_1$ is grounded. A voltage dropping network consisting of resistors $R^5$ and $R^6$ in series is connected between +110 v. and ground, to provide from the junction point of the said resistors a reduced positive voltage for the screen $SN_1$. Its grid $G_1$ is connected to the plate P of amplifier tube B. The winding of relay UR is inserted between the +110 v. supply and the plate $P_1$ of power tube D. Relay UR actuates the "up" direction switch and thus when closed allows power to be supplied to the motor and in order to translate the car upwardly to release the car brakes, whereas when open it cuts off the power supply to the motor and causes the brakes to engage.

It is a characteristic of this circuit that when the car is not level with the floor, the negative voltage on the amplifier grid G is more negative than cut-off voltage. Assuming that the "down" button (which was pressed), has been released by the operator and that the car which has been descending and was therefore controlled by the "down" direction switch, overshoots the floor at which it is to stop. The beam of light of photoelectric leveling unit 23 will then pass through the lower slot 26 of vane 24, and thus there will be some light falling on photo-tube A and therefore a small current will be passing through said photo-tube. This will cause a voltage drop across resistor $R^1$, said voltage drop being hereinafter designated as the "position voltage." This "position voltage" will make the grid G of amplifier tube B highly negative with respect to the cathode K thereof. This will prevent the flow of any current in the plate resistor $R^4$ of amplifier tube B, since tube B is at a voltage less than cut-off voltage, and hence the voltage on the grid $G_1$ of power tube D will be zero.

When the grid voltage on power tube D is zero, current will necessarily flow through its plate $P_1$, and through relay coil UR. This current or controlling response will draw down the armature of said relay coil thereby closing contact $UR^1$ thereof, energizing coil U of the "up" direction switch and consequently motion of the car toward the floor will be initiated.

When the car moves, a velocity voltage is developed across resistor $R^3$ because of the rate of change of current I caused by the reduction in size of the beam of light which is passing through slot 26 of vane 24. This voltage has the effect of counteracting the "position voltage" and will drive the grid voltage of amplifier tube B to zero before the "position voltage" is zero. When the grid voltage on tube B is zero, the tube becomes conductive, causing a voltage drop across its plate resistor $R^4$ which drives the grid $G_1$ on power tube D negative as far as the cut-off point; at this instant relay UR becomes de-energized and stops the elevator as hereinafter described.

Although in order to convey a clearer understanding of this invention, it has been assumed that the moving car would overshoot the desired floor, and then be re-levelled, it should be emphasized that usually the car will stop at the desired level on the first trial, and it therefore does not have to be re-levelled.

The photo-cell circuit will thus normally operate as described in the last preceding paragraph when the car travels from one floor to another; if however, due to say abnormal loading of the car, it overshoots the desired floor, it will be re-levelled as first described.

It should be noted that the grid voltage fed to amplifier tube B is a differential voltage, indicating at any time the amount by which the velocity and position do not correspond to a predetermined function of the velocity and the position of the car. Figure 11 is a graph illustrating the relation between position voltage and velocity voltage with respect to the distance of the car from the floor. Until the car reaches a level such that the beam of light striking the photo-electric cell starts to be intercepted by a vane, the position voltage $V_p$ will be constant; with a vane having straight-sided V-notches, the rate of change of the intensity of the beam of light will be constant, and therefore, the position voltage $V_p$ will drop to zero at a constant rate and will become zero when the elevator is level. However, the velocity voltage $V_{v1}$ or $V_{v2}$ will depend on the velocity of the car or in other words on the current passing through $R^3$. Thus the greater is the velocity of the car, the higher is the velocity voltage, and a car travelling relatively slowly will have a velocity voltage as indicated say, at $V_{v2}$, whereas a car which is travelling faster will have a velocity voltage as indicated at say $V_{v1}$. Since the position voltage and the velocity voltage are of opposite polarity, when the lines VP and $V_{v1}$ or $V_{v2}$ cross, as at $W_1$ or $W_2$, the difference between the position voltage and the velocity voltage will be zero. This is better illustrated in Figure 12 which shows the relation between the grid voltage or amplifier tube B and the distance of the elevator from the floor. The grid voltage is actually the difference between the position voltage and the velocity voltage. As previously explained, when the grid voltage of amplifier tube B becomes zero, the tube becomes conducting and the effects previously explained are achieved. Referring again to Figure 12, it is thus easily seen that the greater is the velocity of the car, the earlier is the time instant at which the grid voltage becomes zero and the earlier the point at which relay UR is de-energized.

While only the circuit of lower photo-electric control unit 23 has been described, it should here be pointed out that the circuit in upper photo-electric control unit 22 is identical. When the "down" button is released, it serves to stop the descending car. Also it will initiate further downward motion of a descending car which has stopped short of the floor, and then stop it level with the floor. Moreover, it will initiate downward motion of an ascending car which has overshot the floor, and then will stop it level with the floor.

The device herein described will actuate the stopping mechanism of an elevator car at a distance from the floor dependent upon the velocity of the car at the instant. It will be apparent to those skilled in the art that this invention can be used to obtain load compensation on the initial stop by virtue of the fact the speed of an elevator car depends upon the load; in fact in many elevators it is the change in speed due to load that causes most of the stopping error.

It is to be noted that the accuracy of the device is not substantially affected by a change in voltage to the light source, nor by dirt on the lens systems 34 and 35, because the position voltage and the velocity voltage are both proportionally affected. Although the apparatus described herein uses vanes which intercept the beam of light between the light and the photo-tube, thereby modulating the light, an alternate construction could be made employing mirrors instead of vanes. With this construction no light would fall on the photo tube unless the car was in such a position that a mirror reflected the beam into the photo-tube, and the mirror would be so shaped that only the proper amount of light corresponding to the car position would fall on the photo-tube.

While throughout this specification vanes having V-shaped slots have been described, in practice slots with curved sides somewhat as shown at 25 and 26 in Figure 4 are used, since the slippage or slide of an elevator car varies as the square of the velocity. Moreover, the apices of the slots, instead of being pointed, are "filled-in" for a distance of one-quarter inch. Thus the car will be deemed to be accurately levelled provided it is within one-quarter inch above or below perfect floor level. Consequently, in practice the position voltage will suddenly drop to zero when the car is one-quarter inch from the floor level. The preferred shape for the vanes may be determined experimentally and it may also be computed mathematically.

Figure 8 is a partial wiring diagram of a slightly modified form of this invention wherein the voltage required for the cathode K and suppressor S of amplifier tube B is obtained by means of a voltage divider R$^7$. A further feature shown in this modified form is the provision of an adjustable tap T whereby the grid bias on amplifier tube B may be varied.

It is possible to substitute a thyratron or gas-type relay tube for the amplifier tube B and power tube D combination, but special means must be used to re-set the thyratron if direct current is used. If alternating current is used on the plate of the thyratron, the re-setting problem is simplified, but the thyratron is subject to errors of up to one cycle and this cannot be tolerated because it represents too great a distance of car travel, except at extremely low speeds. For example at 100 ft. per minute using 25 cycle A. C., one cycle represents $\frac{4}{5}$" of car travel.

A further development according to this invention is to include a correction for acceleration in addition to the correction for velocity. Acceleration is the rate of change of velocity, and mathematically the relation of acceleration to velocity is similar to the relation of velocity to position. The method and means whereby a condenser C and resistor R$^3$ are used to vary the position voltage in accordance with the velocity have previously been described; hence by using a second similar condenser-resistor circuit, an acceleration voltage can be derived from the velocity voltage. The details of the position-velocity-acceleration circuit are shown in Figure 9. R$^1$ contributes a position voltage; the R$^{3a}$ portion of resistor R$^3$ contributes a velocity voltage; and resistor R$^8$ modifies the velocity voltage in accordance with the rate of change of said velocity, or in other words, in accordance with the acceleration or deceleration of the car.

It should be noted that while this device has been described as being located on the car, it could equally well be located on a "selector" at the top of the shaft 5, a selector being merely a well known apparatus providing a reduced scale replica of the car movement.

In a "variable voltage elevator," it is possible to employ the apparatus described in this invention to continuously check the car speed during "slow down" to see whether the car velocity is following the designed pattern of speed with respect to car position and if the velocity is not following the correct pattern, to cause a correction to be applied. This correction can be made dependent upon the amount of deviation of the speed from the correct speed-position pattern.

Figure 10 (which should be read independently of Figures 6–9) illustrates how this invention may be used with a variable voltage elevator. Instead of the plate P$_1$ of power tube D being connected to a relay coil UB as in the previously described embodiments of the invention, it is connected to an extra field EF of generator GEN, thereby affecting the strength of the generator field. In this case, the tubes would be so selected and the circuit so arranged that the cut-off point of amplifier tube B and power tube D would be at a voltage considerably below zero. Therefore the amount of current going to the extra generator field EF would vary with the voltage impressed on the grid of tubes B and D, the range of these variations being limited by the cut-off point voltage and zero voltage. Generally speaking, a variable voltage elevator comprises a motor M having a field MF, the power to said motor being supplied by a generator GEN having a main field GF. The intensity of the generator field is varied by the usual elevator controller and thus the voltage to the motor varies, thereby controlling the speed of the elevator. The extra generator field EF is connected so as to assist the main field, and if the car speed is correct, power tube D allows a certain current to flow through the extra field. If the car speed is low, power tube D will increase the current through the extra field and so raise the voltage, thereby increasing the field and speeding up elevator, and vice versa. In other words, the extra generator field controlled by the photo-electric circuit gives more delicate control of the car speed so as to level it or re-level it accurately.

While this invention has been described as using a light beam in conjunction with a photo-electric circuit, it is apparent that substitutes for this light beam could readily be used, such as electro-magnetic, electro-static, or magnetic fields. These could be used to provide an electrical response similar to the response produced by the varying light beam, dependent upon the position of the car, and this electrical response could then be used in the same manner as described herein to affect the grid of tube B.

It is thought that the construction and use of the invention will be apparent from the above description of the various parts and their purposes. It is understood that the form of my invention herewith shown and described, is to be taken as a preferred example of the same, and that various changes in the shape, size and arrangement of parts may be resorted to, without departing from the spirit of my invention, or the scope of the subjoined claims.

What I claim as my invention is:

1. In combination, a conveyor structure, a structure along which the conveyor is adapted to travel, light responsive means mounted on one structure, a source of light adapted to throw a light beam on the light responsive means, means mounted on the other structure for varying in accordance with the position of the conveyor the quantity of and in accordance with the velocity of the conveyor the rate of change of the quantity of said light which strikes the light responsive means, means controlled by the light responsive means for creating an electrical response which is a function of the quantity of light and of the rate of change of the said quantity of light which strikes the light responsive means, and means controlled by the electrical response for varying the speed of the conveyor.

2. In combination, a conveyor structure, a structure along which the conveyor is adapted to travel, light responsive means mounted on one structure, a source of light adapted to throw a light beam on the light responsive means, means mounted on the other structure for varying in accordance with the position of the conveyor the quantity of light which strikes the light responsive means, and in accordance with the velocity of the conveyor the rate of change of the quantity of said light, said last mentioned means including a vane having an edge at an angle to the line of travel of the conveyor and which is adapted to interrupt the light beam in a gradually varying degree as the source of light and the light responsive means move relatively to the vane, means controlled by the light responsive means for creating an electrical response which is a function of the quantity of light and of the rate of change of the said quantity of light which strikes the light responsive means, and means controlled by the electrical response for varying the speed of the conveyor.

3. In combination, a conveyor structure, a structure along which the conveyor is adapted to travel, light responsive means mounted on one structure, a source of light which is adapted to direct a light beam on the light responsive means, a vane mounted on the other structure and having therein an aperture of a width which is reduced from one end to the other for gradually reducing the quantity of light directed on the light responsive means as the conveyor structure approaches the desired limit of its travel, means controlled by the light responsive means for creating an electrical response which is a function of the quantity of light and of the rate of change of said quantity of light which strikes the light responsive means and means controlled by the electrical response for varying the speed of the conveyor structure.

4. In combination, a conveyor, a shaft in which the conveyor is adapted to travel, light responsive means mounted on the conveyor, a source of light mounted on said conveyor and which is adapted to direct a light beam on the light responsive means, a vane mounted on the shaft and having therein an aperture of a width which is reduced from one end to the other for gradually reducing the quantity of light directed on the light responsive means as the conveyor structure approaches the desired limit of its travel, means controlled by the light responsive means for creating an electrical response which is a function of the quantity of light and of the rate of change of the said quantity of light which strikes the light responsive means and means controlled by the electrical response for varying the speed of the conveyor structure.

5. In combination, a conveyor, a light sensitive element, a source of light adapted to throw a light beam on the light sensitive element, means for varying in accordance with the position of the conveyor the quantity of light which strikes the light sensitive element, a circuit in which said light sensitive element is included, a first resistor in said circuit in series with said light sensitive element to produce an electrical response proportional to the intensity of the light falling on said light sensitive element, means in series with said first resistor comprising two branches one of said branches including a second resistor and the other branch including a condenser and a third resistor in series, said last mentioned means producing an electrical response which is a function of the rate of change of the former response, the said responses combining to provide a controlling electrical response, and means controlled by said controlling response for varying the speed of the conveyor.

6. In combination, a conveyor, a light sensitive element, a source of light adapted to throw a light beam on the light sensitive element, means for varying in accordance with the position of the conveyor the quantity of light which strikes the light sensitive element, a circuit in which said light sensitive element is included, a first resistor in said circuit in series with said light sensitive element to produce an electrical response proportional to the quantity of light falling on said light sensitive element, means in series with said first resistor comprising two branches, one of said branches including a second resistor and the other branch including a condenser and a third resistor in series, said last mentioned means producing an electrical response which is a function of the rate of change of the former response, said responses combining to provide a controlling electrical response, means to amplify said controlling response, and means controlled by said amplified controlling response for varying the speed of the conveyor.

7. In combination, a conveyor, a light sensitive element, a source of light adapted to throw a light beam on the light sensitive element, means for varying in accordance with the position of the conveyor the quantity of light which strikes the light sensitive element, a circuit in which said light sensitive element is included, a first resistor in said circuit in series with said light sensitive element to produce an electrical response proportional to the quantity of light falling on said light sensitive element, means in series with said first resistor comprising two branches, one of said branches including a second resistor and the other branch including a condenser and a third resistor in series, the latter means producing an electrical response which is a function of the rate of change of the former response, means including a resistor member and a condenser member in series, one of said members being tapped on the third resistor and the other of said members being electrically connected between the third resistor and the condenser, the last mentioned means producing an electrical response which is a function of the rate of change of the last mentioned response, said responses combining to provide a controlling electrical response, and means controlled by said controlling response for varying the speed of the conveyor.

8. In combination, a conveyor, a light sensitive element, a source of light adapted to throw a light beam on the light sensitive element, means for varying in accordance with the position of the conveyor the quantity of light which strikes the light sensitive element, a circuit in which said light sensitive element is included, a first resistor in said circuit in series with said light sensitive element to produce an electrical response proportional to the quantity of light falling on said light sensitive element, means in series with said first resistor comprising two branches, one of said branches including a second resistor and the other branch including a condenser and a third resistor in series, the latter means producing an electrical response which is a function of the rate of change of the former response, means including a resistor member and a condenser member in series, one of said members being tapped on the third resistor and the other of said members being electrically connected between the third resistor and the condenser, the last mentioned means producing an electrical response which is a function of the rate of change of the last mentioned response, the said responses combining to provide a controlling electrical response, means to amplify said controlling response, and means controlled by said amplified controlling response for varying the speed of the conveyor.

9. In combination, a conveyor, a light sensitive element, a source of light adapted to throw a light beam on the light sensitive element, means for varying in accordance with the position of the conveyor the quantity of light which strikes the light sensitive element, a circuit in which said light sensitive element is included, a first resistor in said circuit in series with said light sensitive element to produce an electrical response proportional to the quantity of light falling on said light sensitive element, means in series with said first resistor comprising two branches, one of said branches including a second resistor and the other branch including a condenser and a third resistor in series, said last mentioned means producing an electrical response which is a function of the rate of change of the former response, said responses combining to produce a controlling response, which is proportional to the difference between the first mentioned response and the second mentioned response, and means controlled by the controlling response for varying the speed of the conveyor.

10. In combination, a conveyor, a light sensitive element, a source of light adapted to throw a light beam on the light sensitive element, means for varying in accordance with the position of the conveyor the quantity of light which strikes the light sensitive element, a circuit in which said light sensitive element is included, a first resistor in said circuit in series with said light sensitive element to produce an electrical response proportional to the quantity of light falling on said light sensitive element, means in series with said first resistor comprising two branches, one of said branches including a second resistor and the other branch including a condenser and a third resistor in series, said last mentioned means producing an electrical response which is a function of the rate of change of the former response, the said responses combining to produce a controlling response which is proportional to the difference between the first mentioned response and the second mentioned response, relay means responsive to the controlling response to arrest movement of the conveyor when the magnitude of the second mentioned response is greater than that of the first mentioned response.

11. Means for controlling a conveyor and the like, comprising a motor for driving the conveyor; a power circuit for the motor; a switch including main contacts for conducting power to the motor to translate the conveyor in one direction; another switch including main contacts for conducting power to the motor to translate the conveyor in the opposite direction; normally closed contacts co-acting with the first mentioned switch and being adapted to render the main contacts in the other switch non-conducting when the main contacts of the first mentioned switch are closed; normally closed contacts co-acting with the other switch and being adapted to render the main contacts in the first mentioned switch non-conducting when the main contacts of said other switch are closed; manually actuated means for operating each switch; other means for operating each switch, each of said other switch operating means comprising light responsive means, a source of light adapted to throw a light beam on the light responsive means, means for varying in accordance with the position of the conveyor the quantity of light which strikes the light responsive means, and in accordance with the velocity of the conveyor the rate of change of the quantity of said light which strikes the light responsive means, and means controlled by the light responsive means for creating an electrical response which is a function of the quantity of light and of the rate of change of the said quantity of light which strikes the light responsive means, said electrical response being used to operate the switch.

12. In combination, a conveyor structure, a shaft structure in which the conveyor moves, two light responsive means mounted on one structure, two sources of light mounted on the said one structure and which are respectively adapted to throw a light beam on each of the light responsive means, means mounted on the other structure for varying in accordance with the position of the conveyor the quantity of light which strikes one of the light responsive means and in accordance with the velocity of the conveyor in one direction the rate of change of the quantity of said light which strikes the light responsive means, means controlled by the said light responsive means for creating an electrical response which is a function of the quantity of light and of the rate of change of the said quantity of light which strikes the light responsive means, means controlled by the said electrical response for varying the speed of the conveyor, means mounted on the said other structure for varying in accordance with the position of the conveyor the quantity of light which strikes the other of the light responsive means and in accordance with the velocity of the conveyor in the other direction the rate of change of the quantity of said light which strikes the light responsive means, means controlled by the last mentioned light responsive means for creating an electrical response which is a function of the quantity of light and of the rate of change of the said quantity of light which strikes the light responsive means, and means controlled by the said electrical response for varying the speed of the conveyor.

13. In combination, a conveyor, light responsive means, a source of light adapted to throw a light beam on the light responsive means, a vane having an edge at an angle to the line of travel of the conveyor which is adapted to interrupt the light beam in a gradually varying degree as the source of light and the light responsive means move relative to the vane thereby varying in accordance with the position of the conveyor the quantity of light which strikes the light responsive means, means for controlling the speed of the conveyor, an electrical circuit including the light responsive means and the controlling means, and means in the circuit stimulated by the rate of change of the quantity of light striking the light responsive means for regulating the controlling means.

14. A system for controlling electric motor driven conveyor structures of the kind adapted to translate along a guiding structure, comprising a circuit element of variable impedance mounted on one structure, means mounted on the other structure for varying in accordance with the position of the conveyor structure the impedance of said circuit element and in accordance with the velocity of the conveyor structure the rate of change of the impedance of said circuit element, means controlled by the circuit element for creating a controlling electrical response which is a function of the impedance and of the rate of change of the impedance of the circuit element and hence is a function of the position and velocity of the conveyor structure, and means controlled by the controlling electrical response for varying the speed of the conveyor.

15. In combination, a conveyor structure, a guiding structure along which the conveyor structure is adapted to translate, a direct current motor mechanically coupled to the conveyor structure to translate it and of the kind whose speed varies with the applied voltage, a generator to supply variable voltage electrical power to the motor, a controller to vary the voltage applied to the generator field thereby varying the voltage of the electrical power generated by the generator and consequently varying the speed of the motor, the controller being so constructed and arranged as to make the conveyor translate at velocities which are dependent on the position of the conveyor in the guiding structure and in accordance with a predetermined velocity-position pattern, a circuit element of variable impedance mounted on one structure, means mounted on the other structure for varying in accordance with the position of the conveyor structure the impedance of said circuit element and in accordance with the velocity of the conveyor structure the rate of change of the impedance of said circuit element, means controlled by the circuit element for creating a controlling electrical response which is a function of the impedance and of the rate of change of the impedance of the circuit element and hence is a function of the position and velocity of the conveyor structure, and means controlled by the controlling electrical response for applying a corrective voltage to the generator field which varies the voltage of the electrical power generated and hence varies the velocity of the motor to compensate for deviations of motor velocity from the predetermined velocity-position pattern.

16. A system for controlling electric motor driven conveyor structures of the kind adapted to translate along a guiding structure, comprising a circuit element of variable impedance mounted on one structure, means mounted on the other structure for varying in accordance with the position of the conveyor structure the impedance of said circuit element and in accordance with the velocity of the conveyor structure the rate of change of the impedance of said circuit element, a circuit in which said circuit element is included, a first resistor in said circuit in series with said circuit element to produce an electrical response proportional to the impedance of said circuit element, means in series with said first resistor comprising two branches one of said branches including a second resistor and the other branch including a condenser and a third resistor in series, said last mentioned means producing an electrical response which is a function of the rate of change of the former response, the said responses combining to provide a controlling response which is a function of the position and velocity of the conveyor structure, and means controlled by said controlling electrical response for varying the speed of the conveyor structure.

17. A system for controlling electric motor driven conveyor structures of the kind adapted to translate along a guiding structure, comprising a circuit element of variable impedance mounted on one structure, means mounted on the other structure for varying in accordance with the position of the conveyor structure the impedance of said circuit element and in accordance with the velocity of the conveyor structure the rate of change of the impedance of said circuit element, a circuit in which said circuit element is included, a first resistor in said circuit in series with said circuit element to produce an electrical response proportional to the impedance of said circuit element, means in series with said first resistor comprising two branches one of said branches including a second resistor and the other branch including a condenser and a third resistor in series, the latter means producing an electrical response which is a function of the rate of change of the former response, means including a resistor member and a condenser member in series, one of said members being tapped on the third resistor and the other of said members being electrically connected between the third resistor and the condenser, the last mentioned means producing an electrical response which is a function of the rate of change of the last mentioned response, the said responses combining to provide a controlling electrical response which is a function of the position velocity and acceleration of the conveyor structure, and means controlled by the said controlling electrical response for varying the speed of the conveyor structure.

18. Means for controlling a conveyor and the like, comprising a motor for driving the conveyor; a power circuit for the motor; a switch including main contacts for conducting power to the motor to translate the conveyor in one direction; another switch including main contacts for conducting power to the motor to translate the conveyor in the opposite direction; normally closed contacts co-acting with the first mentioned switch and being adapted to render the main contacts in the other switch non-conducting when the main contacts of the first mentioned switch are closed; manually actuated means for operating each switch; other means for operating each switch, each of said other switch operating means comprising a circuit element of variable impedance, means for varying in accordance with the position of the conveyor the impedance of said circuit element and in accordance with the velocity of the conveyor the rate of change of the impedance of said circuit element, and means controlled by the circuit element for creating a controlling electrical response which is a function of the impedance and of the rate of change of the impedance of the circuit element and hence is a function of the position and velocity of the conveyor, the said controlling electrical response being used to operate the switch.

HAROLD C. CRANE.

REFERENCES CITED

The following references are of record in the file of this patent:

UNITED STATES PATENTS

| Number | Name | Date |
|---|---|---|
| 1,915,042 | Whiting | June 20, 1933 |
| 1,963,484 | Borden | June 19, 1934 |
| 2,210,695 | Wagner | Aug. 6, 1940 |
| 2,298,714 | Satini | Oct. 6, 1942 |